A. KAUFMAN.
DETACHABLE ROLLER AND BRACKET FOR SAME.
APPLICATION FILED MAY 25, 1908.
925,105.
Patented June 15, 1909.
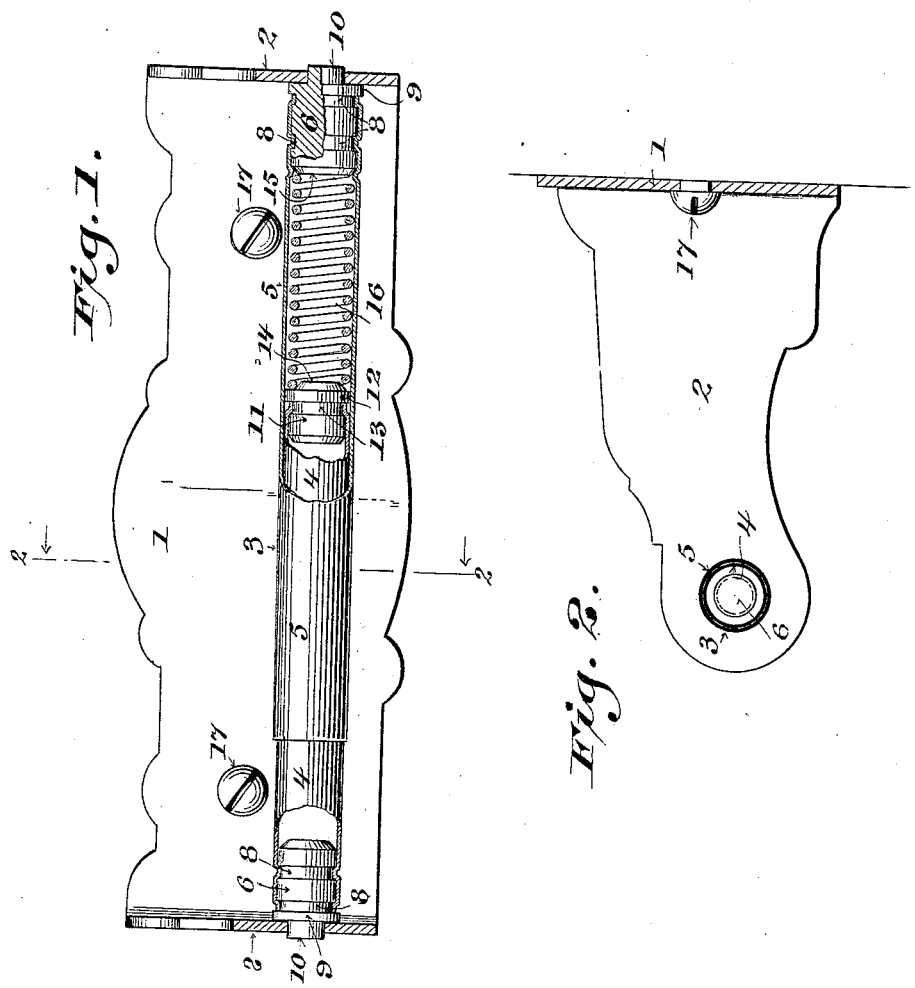

UNITED STATES PATENT OFFICE.

ADAM KAUFMAN, OF MILWAUKEE, WISCONSIN, ASSIGNOR TO RES MANUFACTURING COMPANY, OF MILWAUKEE, WISCONSIN.

DETACHABLE ROLLER AND BRACKET FOR SAME.

No. 925,105.      Specification of Letters Patent.      Patented June 15, 1909.

Application filed May 25, 1908. Serial No. 434,816.

*To all whom it may concern:*

Be it known that I, ADAM KAUFMAN, a citizen of the United States, and resident of Milwaukee, in the county of Milwaukee and State of Wisconsin, have invented certain new and useful Improvements in Detachable Rollers and Brackets for Same; and I do hereby declare that the following is a full, clear, and exact description thereof.

The object of my invention is to provide simple and effective detachable rollers for use in connection with toilet-paper holders, towel-racks and the like; the invention consisting in what is herein shown, described and claimed.

In the drawings: Figure 1 represents a front elevation of a toilet-paper holder bracket provided with an extensible roller embodying the features of my invention, parts being broken away and in section to better illustrate the details of construction, and Fig. 2, a cross-section of same, as indicated by line 2—2 of Fig. 1.

Referring by numerals to the drawings, 1 indicates the base of a one-piece bracket having apertured arms 2 extending therefrom for the support of a roller 3. The roller comprises a tubular member 4, which is telescoped within a similar tubular member 5, each member being provided with a ferrule 6 fitted into its end. These ferrules are composed of solid metallic cylindrical sections having annular grooves 8, into which grooves the ends of the respective tubular members are crimped, there being annular flanges 9 extending from the ferrules adjacent to and beyond the tube-ends. Concentric studs or trunnions 10 project from the flanged ends of the ferrules and serve as supports for the tubes, the trunnions being arranged to fit loosely into the apertures of the bracket arms 2, said apertures constituting bearings in which the said trunnions are adapted to revolve.

The inner end of tube-member 4 that is fitted within the opposite tube-member is provided with a solid metallic head 11, which head has an outer flange 12 adapted to engage and bear upon the inner surface of the tubular member 5, the contacting surfaces of the members having otherwise comparatively loose fit, whereby ease of reciprocation is had one upon the other. The head 11 extends into the tube-member 4 and is also provided with an annular groove 13, into which groove said tube-member is crimped.

Both the head 11 and opposite ferrule end of tube member 5 terminate in beveled edge annular extensions 14 and 15 respectively, upon which are seated the ends of a coil-spring 16, thereby serving to center the spring and prevent its coils from contacting with the inner surface of the tube-member 3. The spring is loosely fitted into said tube-member 5 and serves to spread the members apart, thus securely holding the trunnions of the ferrules in their bearings, the flanges 9 of said ferrules being pressed against the adjacent faces of the arms to produce sufficient friction to prevent "overthrow" of the roller in its rotation.

As shown, provision is made in the bracket 1 for securing the same to a wall or other support by suitable screws 17, but said bracket may be hung in any other convenient manner suitable to the condition of use.

When the device as above described is to be utilized as a towel-rack there will be no change in its construction, it being simply a matter of manufacturing the roller and bracket in different lengths to meet the requirement consistent with the width of towels.

From the foregoing it is obvious that the roller may readily be contracted in opposition to the spring and disengaged from its bearings for the purpose of inserting a roll of paper or towel as the case may be, said roller being thereafter readily compressed and snapped into place between the bracket arms.

I claim:

An extensible roller comprising a pair of tubular members having their inner ends fitted one within the other, ferrules secured in the outer ends of the tubular members, the ferrule of the outer tubular member being provided with an inner beveled extension, trunnions extending from the ferrules, a head secured in the opposite end of the inner tubular member provided with a beveled extension, a coil-spring loosely fitted in the outer tubular member, one end of the spring being seated against the head of the inner tubular member over its beveled extension, its opposite end being seated against the bevel extension of the ferrule of said outer tubular member, and a bracket having apertured arms adapted to receive the ferrule trunnions of the respective tubular members.

In testimony that I claim the foregoing I have hereunto set my hand at Milwaukee, in the county of Milwaukee and State of Wisconsin in the presence of two witnesses.

ADAM KAUFMAN.

Witnesses:
    DUANE MOWRY,
    E. L. KNOBLAUCH.